UNITED STATES PATENT OFFICE.

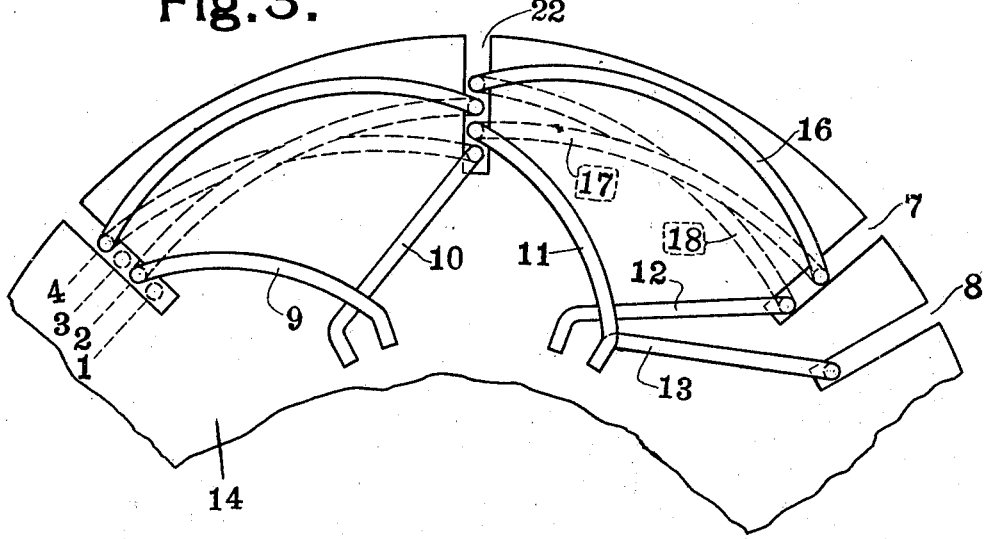
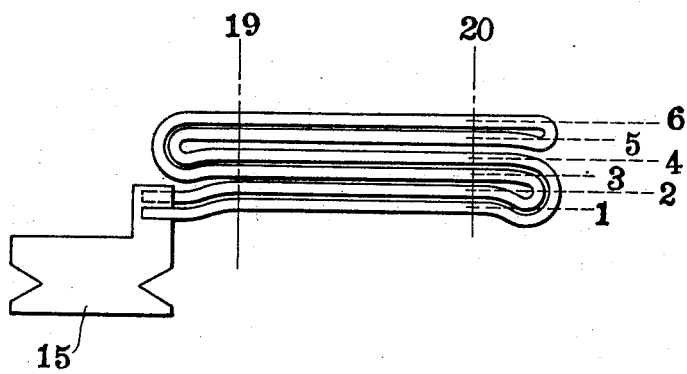
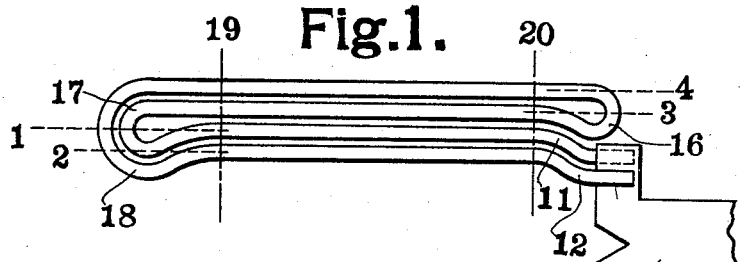

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

COIL FOR DYNAMO-ELECTRIC MACHINES.

1,329,027.  Specification of Letters Patent.  Patented Jan. 27, 1920.

Application filed May 29, 1916. Serial No. 100,512.

*To all whom it may concern:*

Be it known that I, SIMON SPARROW, a citizen of the United States of America, residing at the city of St. Louis, State of Missouri, United States of America, have invented a certain new and useful Coil for Dynamo-Electric Machines, of which the following is such a full, clear, and exact description as will enable any one skilled in the art to which it appertains to make and use the same, reference being had to the accompanying drawings, forming part of this specification.

My invention relates to coils for dynamo electric machines, and particularly to armature coils of the so-called diamond type, adapted to form parts of wave or lap windings, mostly used in machines of the commutator type.

The object of my invention is to provide a coil of more than one turn that shall be simple in construction, permit the overall length of the armature to be reduced and connection to the commutator to be made in a simple, easy and reliable manner.

When dynamo electric machines of the commutator type are provided with windings built up of diamond type coils, the end-connecting portions of the assembled coils form two or more layers. In the prior art, the coil leads, or the beginnings and ends of coils having more than one turn, are never located in adjacent layers. In some forms of windings, one coil lead is located in the bottom layer while the other lead of the same coil is located in the top layer. In other forms, one coil lead is located in the top or bottom layer whereas the other lead of the same coil is located in some intermediate layer not adjacent to the top or bottom layer. In such arrangements the coil leads must be carried clear of the end connection of the assembled coils before they are joined together and to the commutator segments. These segments, or the lugs attached to them, must therefore be located at a considerable distance from the body of the armature, thus increasing the overall length of the machine.

According to the present invention it is possible to make coils of two or more turns while keeping all the conductors terminating in coil leads in two radially adjacent layers. It is preferred to locate said leads in the two bottom layers or those nearest the axis of the armature.

In the accompanying diagrammatic drawings, Figure 1 and Fig. 2 are side views of partially formed coils, while Fig. 3 shows the position occupied by completely formed coils in the slots of an armature.

Referring to the drawings, in order to make a coil in accordance with this invention a wire or strip is first bent into a U-shape. If a two-turn coil is required, then this wire or strip is again bent in a similar manner, so as to produce a sort of U-shaped body with practically parallel sides and legs of preferably unequal length, as shown in Fig. 1. If a three-turn coil is required, then a third operation should bend the two parallel strands of wire or strip into a flat S-shape, as indicated in Fig. 2, and so forth.

Referring more particularly to Fig. 1, which illustrates a two-turn coil, it will be seen that the coil lead 11, connected to the commutator segment 15, is located in the second layer of the coil as first formed. Following the strand from the commutator segment around the bent end-connection 17, the third layer is reached and continuing the fourth layer is reached over the bent end-connection 16. From the fourth layer, the bent end-connection 18 leads to the first layer and to the coil lead 12. The active parts or sides of such a coil lie between the lines 19 and 20 in slots provided in the armature laminations 14. The portions outside of the lines 19 and 20 are usually referred to as end-connections. They are inactive and only add to the armature losses. It is therefore important to keep them as short as possible.

A coil which is first formed as shown in Fig. 1, is pulled apart so as to enable its parts to assume the positions shown in Fig. 3. The lead 12 of the coil shown in Fig. 1, leads to the bottom or first layer of the slot 7 of Fig. 3. From there the end-connection joins the first layer of slot 7 to the top or fourth layer of slot 22. Another end-connection 16 joins the fourth layer of slot 22 to the third layer of slot 7; and the third end-connection 17 joins the third layer of slot 7 to the second layer of slot 22, from which projects the lead 11 joined to the lead 13 leading to the bottom layer in slot 8. The leads 11 and 13 are connected to one commutator segment; lead 12 and another lead leading into a slot (not shown) on the left of 22 and adjacent to it, are joined to the adjacent commutator segment, and so on. The end connection 17 lies as close to the armature core 14 as possible and entirely within the end-connection 18, which latter crosses the former, as clearly shown in Fig. 3, in dotted lines.

The distance between such slots as 22 and 7, in which the sides of the coil are located, is usually about equal to the pole pitch, except in the case of chord windings, as is well understood. It is seen that each slot accommodates one side of at least two coils. The slot 22, for example, accommodates one side of the coil 11, 12, and one side of the coil 9, 10, the coil 9, 10 occupying the layers 1 and 3, and the coil 11, 12 occupying the layers 2 and 4. This improved form of coil makes it possible to bring the commutator segments very close to the armature core and thus reduce the overall length of the armature, as shown in Fig. 1, and does away with the necessity of bending the coil leads so as to bring their ends into radially adjacent layers. It will be understood that not all of the slots of the armature are illustrated in Fig. 3.

Having fully described my invention what I claim as new and desire to secure by Letters Patent of the United States is:—

1. In a dynamo electric machine the combination of a slotted structure, a winding therefor, comprising a plurality of interconnected multi-turn coils, each conductor whose extension forms a coil lead being situated in the portion of its slot adjacent radially to the portion of said slot corresponding to the portion of another slot occupied by the conductor to whose extension it is connected.

2. In a dynamo electric machine the combination of a slotted structure, a winding therefor distributed in a number of concentric layers and comprising a plurality of inter-connected multi-turn coils, all the conductors which are extended into coil leads being located in adjacent layers.

3. In a dynamo electric machine the combination of a slotted structure, a winding therefor comprising a plurality of two-turn coils the conductors of which are disposed in four concentric layers, the conductors in the inside layer being connected to conductors in the fourth layer, those in the fourth layer being connected to conductors in the third layer and the latter being connected to conductors in the second layer.

In testimony whereof, I have hereunto set my hand and affixed my seal in the presence of the two subscribing witnesses.

SIMON SPARROW. [L. S.]

Witnesses:
HAL. A. LYNN,
CHAS. H. WEINEYER.